(12) United States Patent
Angello et al.

(10) Patent No.: US 12,066,351 B2
(45) Date of Patent: *Aug. 20, 2024

(54) GAS TURBINE SWIRL DETECTION

(71) Applicant: Electric Power Research Institute, Inc., Palo Alto, CA (US)

(72) Inventors: Leonard Charles Angello, Mountain View, CA (US); Benjamin Emerson, East Point, GA (US); Timothy Charles Lieuwen, Atlanta, GA (US); David Robert Noble, Vale, NC (US)

(73) Assignee: Electric Power Research Institute, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,334

(22) Filed: Nov. 12, 2021

(65) Prior Publication Data

US 2022/0074817 A1  Mar. 10, 2022

Related U.S. Application Data

(63) Continuation of application No. 16/451,941, filed on Jun. 25, 2019, now Pat. No. 11,204,303.

(51) Int. Cl.
*G01M 15/14* (2006.01)
*F01D 17/08* (2006.01)
(Continued)

(52) U.S. Cl.
CPC ........... *G01M 15/14* (2013.01); *F01D 17/085* (2013.01); *F01D 21/003* (2013.01); *G01K 7/02* (2013.01);
(Continued)

(58) Field of Classification Search
CPC .... G01M 15/14; G01L 23/32; F05D 2230/72; F05D 2230/80
See application file for complete search history.

(56) References Cited

U.S. PATENT DOCUMENTS

| | | |
|---|---|---|
| 4,428,714 A | 1/1984 | Mowill |
| RE32,756 E | 9/1988 | Mowill |

(Continued)

FOREIGN PATENT DOCUMENTS

| | | |
|---|---|---|
| EP | 1445450 A1 | 8/2004 |
| EP | 1662116 A1 | 5/2006 |

(Continued)

OTHER PUBLICATIONS

International Search Report for Application No. PCT/US2020/033320 dated Oct. 2, 2020.

(Continued)

*Primary Examiner* — Eric S. McCall
(74) *Attorney, Agent, or Firm* — Curatolo Sidoti & Trillis Co., LPA; Floyd Trillis, III; Salvatore A. Sidoti (57) ABSTRACT

A non-transitory computer readable medium with instructions stored thereon, the instructions executable by one or more processors for calculating base swirl in a gas turbine; and calculating relative swirl in the gas turbine. Also, a method for gas turbine maintenance, comprising identifying a combustor in need of repair or replacement within a gas turbine; and repairing or replacing the combustor; wherein said identifying comprises calculating base swirl of the gas turbine and calculating relative swirl of the gas turbine in order to associate a gas path from a thermocouple to the combustor in need of repair or replacement.

26 Claims, 1 Drawing Sheet

(51) Int. Cl.
  *F01D 21/00*   (2006.01)
  *G01K 7/02*    (2021.01)
  *G01L 23/32*   (2006.01)
(52) U.S. Cl.
  CPC .......... *G01L 23/32* (2013.01); *F05D 2230/72* (2013.01); *F05D 2230/80* (2013.01)

(56)             References Cited

U.S. PATENT DOCUMENTS

8,789,373 B2    7/2014  Huth
  2004/0148940 A1 8/2004  Venkateswaran et al.
  2006/0090471 A1 5/2006  Shah et al.
  2014/0075954 A1 3/2014  Tralshawala et al.
  2016/0231000 A1 8/2016  Sadil et al.
  2018/0023591 A1 1/2018  Adjan

FOREIGN PATENT DOCUMENTS

EP        3531019 A1    8/2019
  KR     20130092749 A    8/2013

OTHER PUBLICATIONS

Written Opinion for Application No. PCT/US2020/033320 dated Oct. 2, 2020.

GAS TURBINE SWIRL DETECTION

CROSS REFERENCE TO RELATED APPLICATIONS

This application is continuation application of U.S. Ser. No. 16/451,941, filed Jun. 25, 2019, which is incorporated herein by reference.

BACKGROUND

Power generating gas turbine systems may include a plurality of combustors located circumferentially upstream of the turbine. These combustors may create an exhaust temperature pattern, which may be indicative of the health of the gas turbine system. This temperature pattern can also identify individual combustors within the turbine which may be in need of repair or replacement, and knowledge of the swirl of exhaust gases within the turbine aids in repair.

Swirl is the result of shifts in the exhaust pattern generated by a given combustor downstream of another combustor. Some combustors may emit relatively hot or cold streaks of gas when operating abnormally. Inordinately hot or cold streaks may be indicative of a problematic combustor. In order to efficiently repair or replace a combustor, the identification of the problematic combustor must occur. This may be aided by identification of the swirl pattern within the gas turbine.

The exhaust temperature from a gas turbine may be measured with a circumferential array of thermocouples positioned downstream from the turbine. These values provide information not only about the performance of the turbine as a whole, but deviations from one sensor to the next provide information about "health problems" in a hot or cold section. If one combustor is running incorrectly or damaged, its exhaust may be hotter or colder than average, resulting in a measurable temperature deviation in the exhaust. However, the flow rotates upon leaving the combustor and going through the turbine, thereby generating swirl. An apparatus and/or process which may identify the amount of swirl may assist in identifying the azimuthal location of the measured temperature, such that it can be associated with the combustor it originated from. Conventionally, swirl information may only be available from the gas turbine's manufacturer, and varies between engines and with engine operating conditions. Swirl information is used to identify which combustor is responsible for hot or cold exhaust paths, and is therefore useful for quick diagnosis and repair of faulty machines, and/or for health monitoring. This algorithm enables online identification of the swirl from gas turbine operational data, which is important if the swirl information is otherwise unavailable.

Access to swirl information may assist in relating measured temperature data back to a specific component of concern. Furthermore, the amount of swirl may change as a gas turbine ages.

SUMMARY

The present subject matter relates to a non-transitory computer readable medium with instructions stored thereon, the instructions executable by one or more processors for: calculating base swirl in a gas turbine; and calculating relative swirl in the gas turbine.

The present subject matter also relates to a method for gas turbine maintenance, comprising: identifying a combustor in need of repair or replacement within a gas turbine; and repairing or replacing the combustor; wherein said identifying comprises calculating base swirl of the gas turbine and calculating relative swirl of the gas turbine in order to associate a gas path from a thermocouple to the combustor in need of repair or replacement.

The present subject matter provides swirl information by determining an up-to-date swirl number as a function of operating conditions, which enables one to determine swirl from standard data which is available from gas turbine systems and enables users to make health assessments from the data.

BRIEF DESCRIPTION OF THE DRAWING

Embodiments of the subject matter are disclosed with reference to the accompanying drawings and are for illustrative purposes only. The subject matter is not limited in its application to the details of construction or the arrangement of the components illustrated in the drawings. As used herein, "at least one" means one or more than one, and "and/or" means items listed may be included exclusively or in combination. Like reference numerals are used to indicate like components, unless otherwise indicated.

DETAILED DESCRIPTION

The following embodiments of the present subject matter are contemplated:

1. A non-transitory computer readable medium with instructions stored thereon, the instructions executable by one or more processors for:
   calculating base swirl in a gas turbine; and
   calculating relative swirl in the gas turbine.

2. The non-transitory computer readable medium of embodiment 1, wherein calculating base swirl comprises calculating (a) unsteady pressure amplitude as a function of angular position within the gas turbine and/or (b) mean-subtracted exhaust temperature as a function of angular position within the gas turbine.

3. The non-transitory computer readable medium of either embodiment 1 or embodiment 2, wherein calculating base swirl comprises calculating (a) unsteady pressure amplitude as a function of angular position within the gas turbine and (b) mean-subtracted exhaust temperature as a function of angular position within the gas turbine.

4. The non-transitory computer readable medium of any one of embodiments 1 to 3, wherein calculating base swirl comprises determining the average angular offset between the unsteady pressure amplitude as a function of angular position within the gas turbine and mean-subtracted exhaust temperature as a function of angular position within the gas turbine.

5. The non-transitory computer readable medium of embodiment 4, wherein the average angular offset is a function of gas turbine load.

6. The non-transitory computer readable medium of any one of embodiments 1 to 5, wherein calculating base swirl comprises measuring pressure amplitude within the gas turbine and fitting the pressure amplitude to the expression $A * e^{(i*\Theta_d)}$, wherein A is a constant coefficient, i is the square root of negative one, e is Euler's number, and $\Theta_d$ is the angular phase of the measured pressure amplitude.

7. The non-transitory computer readable medium of any one of embodiments 1 to 6, wherein calculating base swirl comprises measuring mean-subtracted gas path temperature within the gas turbine and fitting the mean-subtracted gas path temperature to the expression $B *e\hat{}(i*\Theta_t)$, wherein B is a constant coefficient, i is the square root of negative one, e is Euler's number, and $\Theta_t$ is the angular phase of the measured mean-subtracted gas path temperature.

8 The non-transitory computer readable medium of embodiment 7, wherein calculating base swirl comprises measuring pressure amplitude within the gas turbine and fitting the pressure amplitude to the expression $A *e\hat{}(i*\Theta_d)$, wherein A is a constant coefficient, i is the square root of negative one, e is Euler's number, and $\Theta_d$ is the angular phase of the measured pressure amplitude.

9. The non-transitory computer readable medium of embodiment 8, wherein calculating base swirl comprises calculating a second swirl, wherein said second swirl is $2*\pi*(\Theta_t-\Theta_d)$.

10. The non-transitory computer readable medium of embodiment 9, wherein calculating base swirl comprises determining the average angular offset between the unsteady pressure amplitude as a function of angular position within the gas turbine and mean-subtracted exhaust temperature as a function of angular position within the gas turbine, and wherein the average angular offset is cross correlated with the second swirl.

11. The non-transitory computer readable medium of any one of embodiments 1 to 10, wherein a reference database is updated in real time with base swirl data as a function of gas turbine load.

12. The non-transitory computer readable medium of any one of embodiments 1 to 11, wherein calculating relative swirl comprises calculating the difference between the base swirl and a reference swirl.

13. The non-transitory computer readable medium of embodiment 12, wherein the reference swirl is retrieved from a reference database, and wherein the reference swirl is selected on the basis of turbine load.

14. The non-transitory computer readable medium of either embodiment 12 or embodiment 13, wherein the reference swirl comprises the mean-subtracted exhaust temperature pattern for a plurality of samples.

15. The non-transitory computer readable medium of any one of embodiments 12 to 14, wherein the relative swirl is equal to a cross-correlation shift, wherein the cross-correlation shift is a phase shift that gives the highest correlation coefficient between the base swirl and reference swirl.

16. A computer system comprising at least one processor coupled to memory and the computer readable medium of any one of embodiments 1 to 15.

17. A gas turbine system comprising at least one gas turbine and the computer system of embodiment 16.

18. The gas turbine system of embodiment 17, wherein the computer system is configured to receive real time data input from at least one thermocouple.

19. The gas turbine system of either embodiment 17 or embodiment 18, wherein the computer system is configured to receive real time data input from at least one pressure sensor.

20. A method for gas turbine maintenance, comprising:
identifying a combustor in need of repair or replacement within a gas turbine; and
repairing or replacing the combustor;
wherein said identifying comprises calculating base swirl of the gas turbine and calculating relative swirl of the gas turbine in order to associate a gas path from a thermocouple to the combustor in need of repair or replacement.

21. The method of embodiment 20, wherein calculating base swirl comprises calculating (a) unsteady pressure amplitude as a function of angular position within the gas turbine and/or (b) mean-subtracted exhaust temperature as a function of angular position within the gas turbine.

22. The method of either embodiment 20 or embodiment 21, wherein calculating base swirl comprises calculating (a) unsteady pressure amplitude as a function of angular position within the gas turbine and (b) mean-subtracted exhaust temperature as a function of angular position within the gas turbine.

23. The method of any one of embodiments 20 to 22, wherein calculating base swirl comprises determining the average angular offset between the unsteady pressure amplitude as a function of angular position within the gas turbine and mean-subtracted exhaust temperature as a function of angular position within the gas turbine.

24. The method of embodiment 23, wherein the average angular offset is a function of gas turbine load.

25. The method of any one of embodiments 20 to 24, wherein calculating base swirl comprises measuring pressure amplitude within the gas turbine and fitting the pressure amplitude to the expression $A *e\hat{}(i*\Theta_d)$, wherein A is a constant coefficient, i is the square root of negative one, e is Euler's number, and $\Theta_d$ is the angular phase of the measured pressure amplitude.

26. The method of any one of embodiments 20 to 25, wherein calculating base swirl comprises measuring mean-subtracted gas path temperature within the gas turbine and fitting the mean-subtracted gas path temperature to the expression $B *e\hat{}(i*\Theta_t)$, wherein B is a constant coefficient, i is the square root of negative one, e is Euler's number, and $\Theta_t$ is the angular phase of the measured mean-subtracted gas path temperature.

27. The method of embodiment 26, wherein calculating base swirl comprises measuring pressure amplitude within the gas turbine and fitting the pressure amplitude to the expression $A *e\hat{}(i*\Theta_d)$, wherein A is a constant coefficient, i is the square root of negative one, e is Euler's number, and $\Theta_d$ is the angular phase of the measured pressure amplitude.

28. The method of embodiment 27, wherein calculating base swirl comprises calculating a second swirl, wherein said second swirl is $2*\pi*(\Theta_t-\Theta_d)$.

29. The method of embodiment 28, wherein calculating base swirl comprises determining the average angular offset between the unsteady pressure amplitude as a function of angular position within the gas turbine and mean-subtracted exhaust temperature as a function of angular position within the gas turbine, and wherein the average angular offset is cross correlated with the second swirl.

30. The method of any one of embodiments 20 to 29, wherein a reference database is updated in real time with base swirl data as a function of gas turbine load.

31. The method of any one of embodiments 20 to 30, wherein calculating relative swirl comprises calculating the difference between the base swirl and a reference swirl.

32. The method of embodiment 31, wherein the reference swirl is retrieved from a reference database, and wherein the reference swirl is selected on the basis of turbine load.

33. The method of either embodiment 31 or embodiment 32, wherein the reference swirl comprises the mean-subtracted exhaust temperature pattern for a plurality of samples.

34. The method of any one of embodiments 31 to 33, wherein the relative swirl is equal to a cross-correlation shift, wherein the cross-correlation shift is a phase shift that gives the highest correlation coefficient between the base swirl and reference swirl.

Provided is a non-transitory computer readable medium with instructions stored thereon, the instructions executable by one or more processors for: calculating base swirl in a gas turbine; and calculating relative swirl in the gas turbine.

According to certain embodiments, calculating base swirl comprises calculating (a) unsteady pressure amplitude as a function of angular position within the gas turbine and/or (b) mean-subtracted exhaust temperature as a function of angular position within the gas turbine.

Calculating unsteady pressure amplitude as a function of angular position within the gas turbine and/or calculating mean-subtracted exhaust temperature as a function of angular position within the gas turbine may be done by azimuthal decomposition. Azimuthal decomposition is an acoustic and/or exhaust temperature approach wherein sine waves are "fit" to a temperature pattern across angular position and/or an acoustics pattern across angular position. Any shift between the best fit sine waves is the swirl as determined by azimuthal decomposition. Azimuthal decomposition calculates the cross-correlation between the combustor unsteady pressure amplitude as a function of a predetermined can number within a combustor, the can number corresponding to a radial position, and the mean-subtracted exhaust temperature as a function of gas path radial position. With this data, the radial offset between can number and gas path number that maximizes a correlation coefficient is determined. This may be repeated for multiple data points as possible in a given power band. Next, for each power band, the method computes the average of the radial offsets that maximize the cross-correlation coefficient. The result is an average radial offset between can number (which corresponds to an angular location) and gas path number (which corresponds to an angular location) as a function of load, this is defined as the swirl. Azimuthal decomposition may be included in the calculation of base swirl. The determination of base swirl may consist of azimuthal decomposition.

Calculating unsteady pressure amplitude as a function of angular position within the gas turbine and/or calculating mean-subtracted exhaust temperature as a function of angular position within the gas turbine may be done by cross correlation. Cross correlation projects the combustor pressure amplitude pattern onto the following expression: A *e^(i*$\Theta_d$), where A is a constant coefficient, i is the square root of −1, e is Euler's number (approximately 2.7183), and $\Theta_d$ is the angular phase of the pressure amplitude pattern. Similarly, the mean-subtracted gas path temperature pattern is projected onto the function: B* e^(i*$\Theta_t$), where B is a constant coefficient, i and e are number constants as described above, and $\Theta_t$ is the angular phase of the temperature pattern. This method then defines the swirl to be the phase difference between the pressure amplitude pattern and the gas path temperature pattern. In degrees, this is equal to 2*$\pi$*($\Theta_t$−$\Theta_d$). The shift with the highest correlation to the observed temperature and pressure patterns represents the swirl. According to certain embodiments, this highest correlation to the observed temperature and pressure patterns may be represented as a single coefficient. Cross correlation may be included in the calculation of base swirl. The determination of base swirl may consist of cross correlation.

The determination of base swirl may consist of azimuthal decomposition and cross correlation. Azimuthal decomposition and cross correlation may both be included in the calculation of base swirl, and may be provided as a check on one another. In certain embodiments, both azimuthal decomposition and cross correlation are included in the determination of base swirl, and the determination of swirl in each is compared with one another to ensure a high confidence base swirl. The determination of base swirl may consist of azimuthal decomposition, cross correlation, and comparing the azimuthal decomposition swirl and cross correlation swirl.

Calculating relative swirl within a gas turbine may include auto correlation. The relative swirl is the difference between the swirl at any given operating condition and the known swirl (reference swirl) at a reference condition. The reference swirl may be known from experience with the gas turbine. The reference swirl may be determined by manually comparing pressure dynamics data to gas path temperature data. First, the auto correlation may average the mean-subtracted exhaust temperature pattern for many samples at the reference condition, thereby defining the reference pattern. Next, auto correlation may average the mean-subtracted gas path temperature pattern over many samples at the operating condition of interest, thereby defining the test sample. Thus, auto correlation correlates the reference pattern with the test pattern. Finally, auto correlation determines that the relative swirl is equal to the correlation shift that gives the highest correlation coefficient. The shift with the highest correlation to the observed temperature and pressure patterns represents the swirl. According to certain embodiments, this highest correlation to the observed temperature and pressure patterns may be represented as a single coefficient. Auto correlation may be included in the determination of relative swirl. The determination of relative swirl may consist of auto correlation.

In some embodiments, the temperature cross correlation may be evaluated according to Equation 1:

$$\text{Temperatures: } \rho(\Box c) = \frac{\sum_{1}^{N} \vec{T}(c) \cdot \vec{T}(c - \Delta c)}{\sum_{1}^{N} \vec{T}(c) \cdot \vec{T}(c)} \quad \text{(Equation 1)}$$

$\vec{T}$ can be a vector of temperatures from each of the thermocouples, N can be the number of thermocouples, c can be the index for a given thermocouple, and $\Delta c$ can be the index shift of which the correlation is a function. The thermocouple indices represented by c can range from 1 to N and can be periodic.

In certain embodiments, the pressure cross correlation may be evaluated according to Equation 2:

$$\text{Pressures: } \rho(\Box c) = \frac{\sum_{1}^{N} \vec{p}(c) \cdot \vec{p}(c - \Delta c)}{\sum_{1}^{N} \vec{p}(c) \cdot \vec{p}(c)} \quad \text{(Equation 2)}$$

$\vec{p}$ can be a vector of pressures from each of the pressure probes, N can be the number of combustors, c can be the index for a given pressure probe, and $\Delta c$ can be the index shift, of which the correlation is a function. The pressure indices represented by c can range from 1 to N and can be periodic.

In certain embodiments, calculating base swirl comprises calculating (a) unsteady pressure amplitude as a function of angular position within the gas turbine and (b) mean-subtracted exhaust temperature as a function of angular position within the gas turbine. According to some embodiments, calculating base swirl consists of calculating (a) unsteady pressure amplitude as a function of angular position within the gas turbine and (b) mean-subtracted exhaust temperature as a function of angular position within the gas turbine.

Calculating base swirl may comprise determining the average angular offset between the unsteady pressure amplitude as a function of angular position within the gas turbine and mean-subtracted exhaust temperature as a function of angular position within the gas turbine. In some embodiments, the average angular offset is a function of gas turbine load.

According to certain embodiments, calculating base swirl comprises measuring pressure amplitude within the gas turbine and fitting the pressure amplitude to the expression $A *e\wedge(i*\Theta_d)$, wherein A is a constant coefficient, i is the square root of negative one, e is Euler's number, and $\Theta_d$ is the angular phase of the measured pressure amplitude. In some embodiments, the fitting may be performed by taking a plurality of pressure measurements, given by N, which may be equal to the number of combustors within the gas turbine. $p_n(\theta)$ may represent the $N^{th}$ pressure amplitude as a function of angular position θ. From these measurements, A and Â may be determined by the formulas:

$$\hat{A} = \frac{1}{N}\sum_{1}^{N} p_N(\theta)e^{i\theta}$$

$$A = |\hat{A}|$$

$$\theta_d = \angle \hat{A}$$

In some embodiments, calculating base swirl comprises measuring mean-subtracted gas path temperature within the gas turbine and fitting the mean-subtracted gas path temperature to the expression $B *e\wedge(i*\Theta_t)$, wherein B is a constant coefficient, i is the square root of negative one, e is Euler's number, and $\Theta_t$ is the angular phase of the measured mean-subtracted gas path temperature. In some embodiments, the fitting may be performed by taking a plurality of temperature measurements, given by M, which may be equal to the number of combustors within the gas turbine. $T_M(\theta)$ may represent the $M^{th}$ exhaust temperature measurement as a function of angular position θ. From these measurements, B and B̂ may be determined by the following formulas:

$$\hat{B} = \frac{1}{N}\sum_{1}^{N} T_M(\theta)e^{i\theta}$$

$$B = |\hat{B}|$$

$$\theta_t = \angle \hat{B}$$

In some embodiments, calculating base swirl comprises: measuring pressure amplitude within the gas turbine and fitting the pressure amplitude to the expression $A *e\wedge(i*\Theta_d)$, wherein A is a constant coefficient, i is the square root of negative one, e is Euler's number, and $\Theta_d$ is the angular phase of the measured pressure amplitude; and measuring mean-subtracted gas path temperature within the gas turbine and fitting the mean-subtracted gas path temperature to the expression $B *e\wedge(i*\Theta_t)$, wherein B is a constant coefficient, i is the square root of negative one, e is Euler's number, and $\Theta_t$ is the angular phase of the measured mean-subtracted gas path temperature. In some embodiments, calculating base swirl consists of: measuring pressure amplitude within the gas turbine and fitting the pressure amplitude to the expression $A *e\wedge(i*\Theta_d)$, wherein A is a constant coefficient, i is the square root of negative one, e is Euler's number, and $\Theta_d$ is the angular phase of the measured pressure amplitude; and measuring mean-subtracted gas path temperature within the gas turbine and fitting the mean-subtracted gas path temperature to the expression $B *e\wedge(i*\Theta_t)$, wherein B is a constant coefficient, i is the square root of negative one, e is Euler's number, and $\Theta_t$ is the angular phase of the measured mean-subtracted gas path temperature.

According to certain embodiments, calculating base swirl comprises calculating a second swirl, wherein said second swirl is $2*\pi*(\Theta_t-\Theta_d)$.

Calculating base swirl may comprise determining the average angular offset between the unsteady pressure amplitude as a function of angular position within the gas turbine and mean-subtracted exhaust temperature as a function of angular position within the gas turbine, and wherein the average angular offset is compared with the second swirl. An example of MATLAB® code which may be included on the non-transitory computer readable medium for the sake of this comparison may be seen in Example 1, which is provided only by way of example and not limitation. Initially, temperature and pressure amplitude patterns are determined at the maximum load of the gas turbine. A variable may be assigned to the maximum load in megawatts, and as well as an array assigned to all of the data points at lower loads, wherein the load is measured as its difference from the maximum load. Then, data points are gathered for a plurality of temperature and pressure measurement devices at the loads within the array, and corresponded to the given load by taking the arithmetic average of the temperature and pressure measurements at given loads. The difference between the temperature and pressure measurements in terms of angular difference may be the swirl.

In some embodiments, the non-transitory computer readable medium may comprise instructions for updating a reference database with base swirl data as a function of gas turbine load. According to certain embodiments, the reference database may be updated in real time. The reference database may be included on the same non-transitory computer readable medium or on a separate non-transitory computer readable medium. In some embodiments, the base swirl may be calibrated only once from the reference database. According to certain embodiments, the reference database is configured to be updated with new data as directed by the user.

Calculating relative swirl may comprise calculating the difference between the base swirl and a reference swirl. In some embodiments, this reference swirl may be obtained from a database of known swirls corresponding to a given gas turbine load. In some embodiments, the reference swirl is retrieved from a reference database, and wherein the reference swirl is selected on the basis of turbine load. According to certain embodiments, the reference swirl comprises the mean-subtracted exhaust temperature pattern for a plurality of samples.

In certain embodiments, the relative swirl is equal to a cross-correlation shift, wherein the cross-correlation shift is a phase shift that gives the highest correlation coefficient between the base swirl and reference swirl. Provided by way of example and not limitation, an example of MATLAB® code which may be included on the non-transitory computer readable medium for the sake of this comparison may be seen in Example 2. Initially, a calibration may be performed, wherein a temperature pattern at the maximum load of the gas turbine is calculated. Then, at separate time intervals, an array may be populated with data points for a plurality of temperature and pressure measurement devices at the loads within the array, and corresponded to the given load by taking the arithmetic average of the temperature and pressure measurements at given loads. This data may then be compared with data from similar gas turbine loads. After that, the collection of temperature measurements across a given time may be averaged to produce a pattern that is no longer a function of time, but a function of azimuth or angle only. The pattern may then be subtracted from the average, and it may be doubled to simulate two paths around the gas turbine. The mean-subtracted temperature pattern may then be cross correlated against the temperature pattern of the gas turbine as maximum load, and the cross correlation parameter is then a shift corresponding to angular position. This may produce a correlation coefficient as a function of angular shift, thereby indicating the magnitude of angular shift required for the mean-subtracted temperature field at maximum load. The angular shift with the maximum correlation coefficient may be the relative swirl, indicating the amount of swirl at the current load relative to the swirl at maximum load.

According to certain embodiments, the non-transitory computer readable medium may be included in a computer system comprising at least one processor coupled to memory. In some embodiments, a gas turbine system comprising at least one gas turbine may provide data to the computer system comprising the non-transitory computer readable medium. The computer system may be configured to receive data input from at least one thermocouple within the gas turbine, and the data input may be performed in real time. The computer system may be configured to receive data input from at least one pressure sensor, and the data input may be performed in real time.

Also provided is a method for gas turbine maintenance, comprising: identifying a combustor in need of repair or replacement within a gas turbine; and repairing or replacing the combustor; wherein said identifying comprises calculating base swirl of the gas turbine and calculating relative swirl of the gas turbine in order to associate a gas path from a thermocouple to the combustor in need of repair or replacement.

According to certain embodiments, calculating base swirl comprises calculating (a) unsteady pressure amplitude as a function of angular position within the gas turbine and/or (b) mean-subtracted exhaust temperature as a function of angular position within the gas turbine.

Calculating unsteady pressure amplitude as a function of angular position within the gas turbine and/or calculating mean-subtracted exhaust temperature as a function of angular position within the gas turbine may be done by azimuthal decomposition. Azimuthal decomposition is an acoustic and/or exhaust temperature approach wherein sine waves are "fit" to a temperature pattern across angular position and/or an acoustics pattern across angular position. Any shift between the best fit sine waves is the swirl as determined by azimuthal decomposition. Azimuthal decomposition calculates the cross-correlation between the combustor unsteady pressure amplitude as a function of a predetermined can number within a combustor, which corresponds to a radial position, and the mean-subtracted exhaust temperature as a function of gas path radial position. With this data, the radial offset between can number and gas path number that maximizes a correlation coefficient is determined. This may be repeated for multiple data points as possible in a given power band. Next, for each power band, the method computes the average of the radial offsets that maximize the cross-correlation coefficient. The result is an average radial offset between can number (which corresponds to an angular location) and gas path number (which corresponds to an angular location) as a function of load, this is defined as the swirl. Azimuthal decomposition may be included in the calculation of base swirl. The determination of base swirl may consist of azimuthal decomposition.

Calculating unsteady pressure amplitude as a function of angular position within the gas turbine and/or calculating mean-subtracted exhaust temperature as a function of angular position within the gas turbine may be done by cross correlation. Cross correlation projects the combustor pressure amplitude pattern onto the following expression: $A *e^{\wedge}(i*\Theta_d)$, where A is a constant coefficient, i is the square root of $-1$, e is Euler's number, and $\Theta_d$ is the angular phase of the pressure amplitude pattern. Similarly, the mean-subtracted gas path temperature pattern is projected onto the function: $B *e^{\wedge}(i*\Theta_t)$, where B is a constant coefficient, e and i are as defined above, and $\Theta_t$ is the angular phase of the temperature pattern. This method then defines the swirl to be the phase difference between the pressure amplitude pattern and the gas path temperature pattern. In degrees, this is equal to $2*\pi*(\Theta_t-\Theta_d)$. The shift with the highest correlation to the observed temperature and pressure patterns represents the swirl. According to certain embodiments, this highest correlation to the observed temperature and pressure patterns may be represented as a single coefficient. Cross correlation may be included in the calculation of base swirl. The determination of base swirl may consist of cross correlation.

The determination of base swirl may consist of azimuthal decomposition and cross correlation. Azimuthal decomposition and cross correlation may both be included in the calculation of base swirl, and may be provided as a check on one another. In certain embodiments, both azimuthal decomposition and cross correlation are included in the determination of base swirl, and the determination of swirl in each is compared with one another to ensure a high confidence base swirl. The determination of base swirl may consist of azimuthal decomposition, cross correlation, and comparing the azimuthal decomposition swirl and cross correlation swirl.

Calculating relative swirl within a gas turbine may include auto correlation. The relative swirl is the difference between the swirl at any given operating condition and the known swirl (reference swirl) at a reference condition. The reference swirl may be known from experience with the gas turbine. The reference swirl may be determined by manually comparing pressure dynamics data to gas path temperature data. First, the auto correlation may average the mean-subtracted exhaust temperature pattern for many samples at the reference condition, thereby defining the reference pattern. Next, auto correlation may average the mean-subtracted gas path temperature pattern over many samples at the operating condition of interest, thereby defining the test sample. Thus, auto correlation correlates the reference pattern with the test pattern. Finally, auto correlation determines that the relative swirl is equal to the correlation shift that gives the highest correlation coefficient. Auto correlation may be included in the determination of relative swirl. The determination of relative swirl may consist of auto correlation.

The disclosed method may provide that calculating base swirl comprises calculating (a) unsteady pressure amplitude as a function of angular position within the gas turbine and/or (b) mean-subtracted exhaust temperature as a function of angular position within the gas turbine. In some embodiments, the method may provide that calculating base swirl comprises calculating (a) unsteady pressure amplitude as a function of angular position within the gas turbine and (b) mean-subtracted exhaust temperature as a function of angular position within the gas turbine. According to certain embodiments, calculating base swirl comprises determining the average angular offset between the unsteady pressure amplitude as a function of angular position within the gas turbine and mean-subtracted exhaust temperature as a function of angular position within the gas turbine. The average angular offset may be a function of gas turbine load, or may be a function of gas turbine load only. In some embodiments, the average angular offset is independent of time.

The method of the disclosed embodiments may provide that calculating base swirl comprises: measuring pressure amplitude within the gas turbine; and fitting the pressure amplitude to the expression $A *e^{(i*\Theta_d)}$, wherein A is a constant coefficient, i is the square root of negative one, e is Euler's number, and $\Theta_d$ is the angular phase of the measured pressure amplitude. In some embodiments, the fitting may be performed by taking a plurality of pressure measurements, given by N, which may be equal to the number of combustors within the gas turbine. $p_n(\theta)$ may represent the $N^{th}$ pressure amplitude as a function of angular position $\theta$. From these measurements, A and $\hat{A}$ may be determined by the formulas:

$$\hat{A} = \frac{1}{N}\sum_1^N p_N(\theta)e^{i\theta}$$

$$A = |\hat{A}|$$

$$\theta_d = \angle \hat{A}$$

According to certain embodiments, calculating base swirl comprises: measuring mean-subtracted gas path temperature within the gas turbine; and fitting the mean-subtracted gas path temperature to the expression $B *e^{(i*\Theta_t)}$, wherein B is a constant coefficient, i is the square root of negative one, e is Euler's number, and $\Theta_t$ is the angular phase of the measured mean-subtracted gas path temperature. In some embodiments, the fitting may be performed by taking a plurality of temperature measurements, given by M, which may be equal to the number of combustors within the gas turbine. $T_M(\theta)$ may represent the $M^{th}$ exhaust temperature measurement as a function of angular position $\theta$. From these measurements, B and $\hat{B}$ may be determined by the following formulas:

$$\hat{B} = \frac{1}{N}\sum_1^N T_M(\theta)e^{i\theta}$$

$$B = |\hat{B}|$$

$$\theta_t = \angle \hat{B}$$

In some embodiments, the method provides that calculating base swirl comprises measuring pressure amplitude within the gas turbine and fitting the pressure amplitude to the expression $A *e^{(i*\Theta_d)}$, wherein A is a constant coefficient, i is the square root of negative one, e is Euler's number, and $\theta_d$ is the angular phase of the measured pressure amplitude. In certain embodiments, calculating base swirl comprises calculating a second swirl, wherein said second swirl is $2*\pi*(\Theta_t-\Theta_d)$.

Calculating base swirl may comprise determining the average angular offset between the unsteady pressure amplitude as a function of angular position within the gas turbine and mean-subtracted exhaust temperature as a function of angular position within the gas turbine, and wherein the average angular offset is compared with the second swirl. An example of MATLAB® code which may be included on the non-transitory computer readable medium for the sake of this comparison may be seen in Example 1, which is provided only by way of example and not limitation. Initially, temperature and pressure amplitude patterns are determined at the maximum load of the gas turbine. A variable may be assigned to the maximum load in megawatts, and as well as an array assigned to all of the data points at lower loads, wherein the load is measured as its difference from the maximum load. Then, data points are gathered for a plurality of temperature and pressure measurement devices at the loads within the array, and corresponded to the given load by taking the arithmetic average of the temperature and pressure measurements at given loads. The difference between the temperature and pressure measurements in terms of angular difference may be the swirl.

The method may further provide that a reference database is updated with base swirl data as a function of gas turbine load. In some embodiments, a non-transitory computer readable medium may comprise instructions for updating a reference database with base swirl data as a function of gas turbine load. According to certain embodiments, the reference database may be updated in real time. The reference database may be included on the same non-transitory computer readable medium or on a separate non-transitory computer readable medium. In some embodiments, the base swirl may be calibrated only once from the reference database. According to certain embodiments, the reference database is configured to be updated with new data as directed by the user.

In certain embodiments, calculating relative swirl comprises calculating the difference between the base swirl and a reference swirl. The method may further provide that the reference swirl is retrieved from a reference database, and wherein the reference swirl is selected on the basis of turbine load. In some embodiments, the method may provide that the reference swirl comprises the mean-subtracted exhaust temperature pattern for a plurality of samples.

According to certain embodiments, the relative swirl is equal to a cross-correlation shift, wherein the cross-correlation shift is a phase shift that gives the highest correlation coefficient between the base swirl and reference swirl. Initially, a calibration may be performed, wherein a temperature pattern at the maximum load of the gas turbine is calculated. Then, at separate time intervals, an array may be populated with data points for a plurality of temperature and pressure measurement devices at the loads within the array, and corresponded to the given load by taking the arithmetic average of the temperature and pressure measurements at given loads. This data may then be compared with data from similar gas turbine loads. After that, the collection of temperature measurements across a given time may be averaged to produce a pattern that is no longer a function of time, but a function of azimuth or angle only. The pattern may then be subtracted from the average, and it may be doubled to simulate two paths around the gas turbine. The mean-subtracted temperature pattern may then be cross correlated against the temperature pattern of the gas turbine as maximum load, and the cross correlation parameter is then a shift corresponding to angular position. This may produce a correlation coefficient as a function of angular shift, thereby indicating the magnitude of angular shift required for the mean-subtracted temperature field at maximum load. The angular shift with the maximum correlation coefficient may be the relative swirl, indicating the amount of swirl at the current load relative to the swirl at maximum load.

Figure 1:
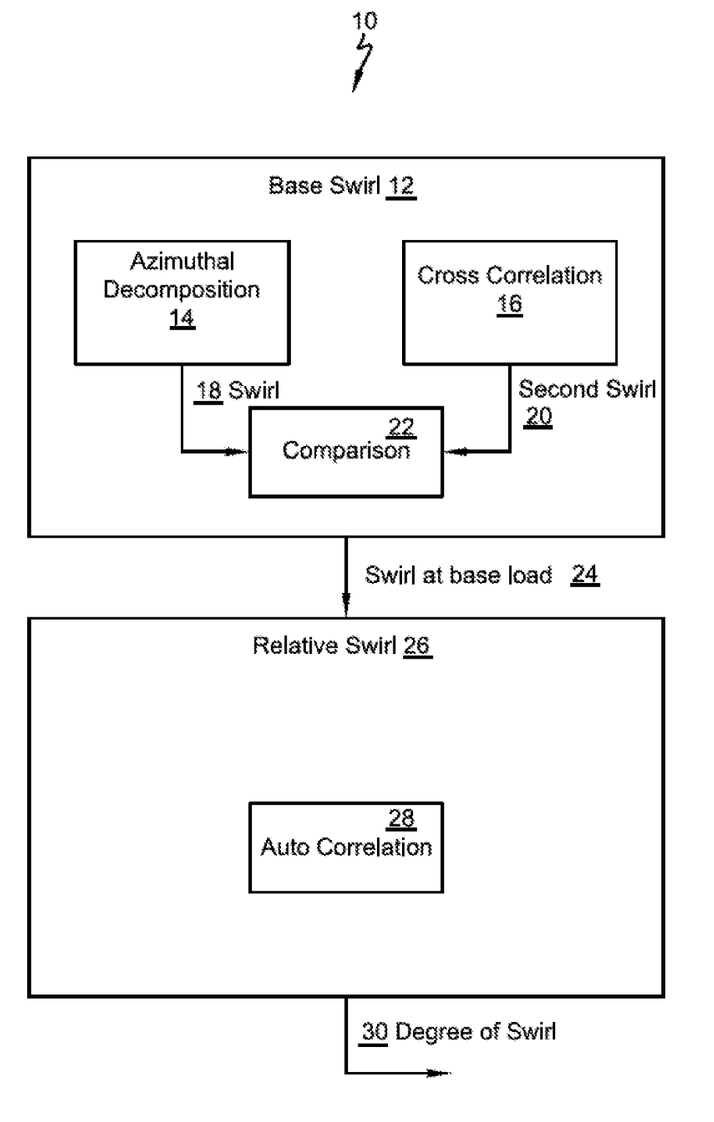
FIG. 1 is a block diagram illustrating certain embodiments of the present subject matter.

FIG. 1 is a block diagram illustrating certain embodiments of the present subject matter. The instructions 10 include calculating base swirl 12 and calculating relative swirl 26. The calculation of base swirl 12 includes azimuthal decomposition 14, cross correlation 16, or both azimuthal decomposition 14 and cross correlation 16. Azimuthal decomposition 14 outputs a swirl 18, and cross correlation outputs a second swirl 20 independently. The swirl 18 and second swirl 20 may be compared 22 to ensure substantial agreement in the determination of base swirl 12. The base swirl 12 provides an output of the swirl at base load 24, which is passed to the determination of relative swirl 26. Utilizing the swirl at base load 24 determined by the calculation of base swirl 12, the determination of relative swirl 26 utilizes auto correlation 28 to determine the relative swirl 26. The output of relative swirl 26 is a degree of swirl 30.

The following examples are set forth merely to further illustrate the subject gas turbine swirl detection. The illustrative examples should not be construed as limiting the subject matter in any manner.

Example 1

Initially, temperature and pressure amplitude patterns are determined at the maximum load of the gas turbine. A variable may be assigned to the maximum load in megawatts, and as well as an array assigned to all of the data points at lower loads, wherein the load is measured as its difference from the maximum load. Then, data points are gathered for a plurality of temperature and pressure measurement devices at the loads within the array, and corresponded to the given load by taking the arithmetic average of the temperature and pressure measurements at given loads. The difference between the temperature and pressure measurements in terms of angular difference may be the swirl, and in this particular example, the reference swirl at maximum load. Averages can be subtracted from the arrays based on the computation of the arithmetic averages to obtain the mean-subtracted array. A mean-subtracted array can be cross-correlated to obtain the reference swirl at maximum load.

%% % Comments are indicated in percentage symbols %%%
%%%%% STEP 1—Find Temperature and Amplitude Patterns at max load %%%%%%%%%%
%% generate temperature and amplitude patterns at max load
loadTol=10; % load tolerance in MW
maxLoadInds=find (abs (loads−maxLoad)<=loadTol);
sampleT=TC_blocks_all(maxLoadInds,:);
prime_ref_T=mean(sampleT,1)−mean(mean(sampleT));
sampleAmp=Amp_blocks_all(maxLoadInds,:);
prime_ref_Amp=mean (sampleAmp,1)−mean(mean (sampleAmp));
%%%%% STEP 2—Cross-correlate %%%%%%%%%%
% Step 2 may utilize a similar cross correlation strategy as shown in Example 2%%%

Example 2

Initially, a calibration may be performed, wherein a temperature pattern at the maximum load of the gas turbine is calculated. Then, at separate time intervals, an array may be populated with data points for a plurality of temperature and pressure measurement devices at the loads within the array, and corresponded to the given load by taking the arithmetic average of the temperature and pressure measurements at given loads. This data may then be compared with data from similar gas turbine loads. After that, the collection of temperature measurements across a given time may be averaged to produce a pattern that is no longer a function of time, but a function of azimuth/angle only. The pattern may then be subtracted from the average, and it may be doubled to simulate two paths around the gas turbine. The mean-subtracted temperature pattern may then be cross correlated against the temperature pattern of the gas turbine as maximum load, and the cross correlation parameter is then a shift corresponding to angular position. This may produce a correlation coefficient as a function of angular shift, thereby indicating the magnitude of angular shift required for the mean-subtracted temperature field at maximum load. The angular shift with the maximum correlation coefficient may be the relative swirl, indicating the amount of swirl at the current load relative to the swirl at maximum load.

%%% Comments are indicated in percentage symbols %%%
%%%%%%%%%%%%%%%%%% STEP 1—(CALIBRATION, may be done once) %%%%%%%%%%%%%%%%%%
8% generate temperature pattern at max load
loadTol=10; % load tolerance in MW
maxLoadInds=find (abs(loads−maxLoad)<=loadTol);
sample=TC_blocks_all(maxLoadInds,:);
prime_ref=mean (sample,1)−mean(mean(sample));
%%%%%%%%%%%%%%%%%% STEP 2–DO AT EACH TIME STEP %%%%%%%%%%%%%%%%%%
%% At each time step, implement the following
% find past times that have similar load to the present load
loadInds=find(abs(loads−loads(t))<=loadTol);
% collect the temperature measurements from all past times that had similar load (including the newly added time step)
sample=TC_blocks_all (loadInds,:);
% Mean-subtract: Average the collection of temperature measurements across time to produce a pattern that is only a function of azimuth/angle. Subtract from this pattern its average.
prime_test=mean (sample,1)−mean (mean (sample));
% Take the vector of mean-subtracted temperature pattern and repeat it once to double its length (as if you are going angularly around the engine two times) prime_long=[prime_test, prime_test];
% Cross correlate the mean-subtracted temperature pattern against the temperature pattern belonging to max load. The cross-correlation parameter (the shift parameter) is angular position (azimuth). This will produce a correlation coefficient as a function of angular shift (in other words, it will indicate how much angular shift is required for the current mean-subtracted temperature field to look like the mean-subtracted temperature field at max load shiftInds=[1:size(TC_blocks_all,2), 1:size (TC_blocks_all,2)];

rho=zeros(1,size (TC_blocks_all,2));
for       shiftIndex=1:size(TC_blocks_all, 2)
   testSignal=prime_long(shiftIndex:shiftIndex+size
      (TC_blocks_all,2)−1);
   rhoMat=corrcoef(prime_ref,testSignal);
   rho(shiftIndex)=rhoMat(1,2);
end
% Find the angular shift that produced the maximum correlation coefficient. This is the relative swirl (the amount of swirl at the current load relative to the swirl at max load)
rhoVec(t)=rho(rho==max(rho));
shiftIndVec(t)=find(rho==max(rho));

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

The invention claimed is:

1. A non-transitory computer readable medium with instructions stored thereon,
   wherein the non-transitory computer readable medium is coupled to one or more processors;
   wherein the instructions are executable by the one or more processors configured to perform calculating base swirl and relative swirl in a gas turbine;
   wherein calculating the relative swirl comprises calculating the difference between the base swirl and a reference swirl retrieved from a reference database; and
   wherein calculating the base swirl comprises determining an average angular offset between an unsteady pressure amplitude as a function of an angular position within the gas turbine and a mean-subtracted exhaust temperature as a function of angular position within the gas turbine, wherein the average angular offset is a function of a gas turbine load.

2. The non-transitory computer readable medium of claim 1, wherein the reference database is updated in real time with the base swirl data as a function of gas turbine load.

3. The non-transitory computer readable medium of claim 1, wherein the reference swirl is selected on the basis of a turbine load, wherein the reference swirl comprises a mean-subtracted exhaust temperature pattern for a plurality of samples.

4. The non-transitory computer readable medium of claim 1, wherein the relative swirl is equal to a cross-correlation shift, wherein the cross-correlation shift is a phase shift that gives the highest correlation coefficient between the base swirl and reference swirl.

5. A gas turbine system comprising:
   a computer system comprising at least one processor coupled to memory and the non-transitory computer readable medium of claim 1; and
   at least one gas turbine comprising at least one thermocouple and at least one pressure sensor, wherein the computer system is configured to receive real time data input from the at least one thermocouple, wherein the computer system is configured to receive real time data input from the at least one pressure sensor.

6. A non-transitory computer readable medium with instructions stored thereon,
   wherein the non-transitory computer readable medium is coupled to one or more processors;
   wherein the instructions are executable by the one or more processors configured to perform calculating base swirl and relative swirl in a gas turbine;
   wherein calculating the relative swirl comprises calculating the difference between the base swirl and a reference swirl retrieved from a reference database; and
   wherein calculating the base swirl comprises measuring a pressure amplitude within the gas turbine and fitting the pressure amplitude to the expression $A * e(i*\Theta_d)$, wherein A is a constant coefficient, i is the square root of negative one, e is Euler's number, and $\Theta_d$ is the angular phase of the measured pressure amplitude.

7. The non-transitory computer readable medium of claim 6, wherein the reference database is updated in real time with the base swirl data as a function of gas turbine load.

8. The non-transitory computer readable medium of claim 6, wherein the reference swirl is selected on the basis of a turbine load, wherein the reference swirl comprises a mean-subtracted exhaust temperature pattern for a plurality of samples.

9. The non-transitory computer readable medium of claim 6, wherein the relative swirl is equal to a cross-correlation shift, wherein the cross-correlation shift is a phase shift that gives the highest correlation coefficient between the base swirl and reference swirl.

10. A gas turbine system comprising:
    a computer system comprising at least one processor coupled to memory and the non-transitory computer readable medium of claim 6; and
    at least one gas turbine comprising at least one thermocouple and at least one pressure sensor, wherein the computer system is configured to receive real time data input from the at least one thermocouple, wherein the computer system is configured to receive real time data input from the at least one pressure sensor.

11. A non-transitory computer readable medium with instructions stored thereon,
    wherein the non-transitory computer readable medium is coupled to one or more processors;
    wherein the instructions are executable by the one or more processors configured to perform calculating base swirl and relative swirl in a gas turbine;
    wherein calculating the relative swirl comprises calculating the difference between the base swirl and a reference swirl retrieved from a reference database; and
    wherein calculating the base swirl comprises measuring a mean-subtracted gas path temperature within the gas turbine and fitting the mean-subtracted gas path temperature to the expression $B * e^{(i*\Theta_t)}$, wherein B is a constant coefficient, i is the square root of negative one, e is Euler's number, and $\Theta_t$ is the angular phase of the measured mean-subtracted gas path temperature.

12. The non-transitory computer readable medium of claim 11, wherein the reference database is updated in real time with the base swirl data as a function of gas turbine load.

13. The non-transitory computer readable medium of claim 11, wherein the reference swirl is selected on the basis of a turbine load, wherein the reference swirl comprises a mean-subtracted exhaust temperature pattern for a plurality of samples.

14. The non-transitory computer readable medium of claim 11, wherein the relative swirl is equal to a cross-correlation shift, wherein the cross-correlation shift is a phase shift that gives the highest correlation coefficient between the base swirl and reference swirl.

15. A gas turbine system comprising:
- a computer system comprising at least one processor coupled to memory and the non-transitory computer readable medium of claim 11; and
- at least one gas turbine comprising at least one thermocouple and at least one pressure sensor, wherein the computer system is configured to receive real time data input from the at least one thermocouple, wherein the computer system is configured to receive real time data input from the at least one pressure sensor.

16. The non-transitory computer readable medium of claim 11, wherein calculating the base swirl further comprises measuring a pressure amplitude within the gas turbine and fitting the pressure amplitude to the expression $A * e^{(i*\Theta_d)}$, wherein A is a constant coefficient, i is the square root of negative one, e is Euler's number, and $\Theta_d$ is the angular phase of the measured pressure amplitude, wherein calculating the base swirl comprises calculating a second swirl, wherein said second swirl is $2*\pi*(\Theta_t - \Theta_d)$.

17. The non-transitory computer readable medium of claim 16, wherein calculating the base swirl further comprises determining an average angular offset between an unsteady pressure amplitude as a function of an angular position within the gas turbine and a mean-subtracted exhaust temperature as a function of angular position within the gas turbine, and wherein the average angular offset is cross correlated with the second swirl.

18. A method for gas turbine maintenance, comprising:
- identifying a combustor in need of repair or replacement within a gas turbine; and
- repairing or replacing the combustor;
- wherein said identifying comprises calculating base swirl of the gas turbine and calculating relative swirl of the gas turbine in order to identify a gas path from a thermocouple to the combustor in need of repair or replacement, and wherein calculating relative swirl comprises calculating the difference between the base swirl and a reference swirl retrieved from a reference database as a function of gas turbine load.

19. The method of claim 18, wherein calculating base swirl comprises calculating
- (a) unsteady pressure amplitude as a function of angular position within the gas turbine and/or
- (b) mean-subtracted exhaust temperature as a function of angular position within the gas turbine.

20. The method of claim 18, wherein calculating base swirl comprises calculating (a) unsteady pressure amplitude as a function of angular position within the gas turbine and (b) mean-subtracted exhaust temperature as a function of angular position within the gas turbine.

21. The method of claim 18, wherein calculating base swirl comprises determining an average angular offset between an unsteady pressure amplitude as a function of angular position within the gas turbine and a mean-subtracted exhaust temperature as a function of angular position within the gas turbine, wherein the average angular offset is a function of gas turbine load.

22. The method of claim 18, wherein calculating base swirl comprises measuring a pressure amplitude within the gas turbine and fitting the pressure amplitude to the expression $A * e^{(i*\Theta_d)}$, wherein A is a constant coefficient, i is the square root of negative one, e is Euler's number, and $\Theta_d$ is the angular phase of the measured pressure amplitude.

23. The method of claim 18, wherein the reference swirl is selected on the basis of turbine load, wherein the reference swirl comprises a mean-subtracted exhaust temperature pattern for a plurality of samples, wherein the relative swirl is equal to a cross-correlation shift, wherein the cross-correlation shift is a phase shift that gives the highest correlation coefficient between the base swirl and reference swirl.

24. The method of claim 18, wherein calculating base swirl comprises measuring a mean-subtracted gas path temperature within the gas turbine and fitting the mean-subtracted gas path temperature to the expression $B * e^{(i*\Theta_t)}$, wherein B is a constant coefficient, i is the square root of negative one, e is Euler's number, and $\Theta_t$ is the angular phase of the measured mean-subtracted gas path temperature.

25. The method of claim 24, wherein calculating base swirl further comprises measuring a pressure amplitude within the gas turbine and fitting the pressure amplitude to the expression $A * e^{(i*\Theta_d)}$, wherein A is a constant coefficient, i is the square root of negative one, e is Euler's number, and $\Theta_d$ is the angular phase of the measured pressure amplitude, wherein calculating base swirl comprises calculating a second swirl, wherein said second swirl is $2*\pi*(\Theta_t - \Theta_d)$.

26. The method of claim 25, wherein calculating base swirl further comprises determining an average angular offset between an unsteady pressure amplitude as a function of angular position within the gas turbine and a mean-subtracted exhaust temperature as a function of angular position within the gas turbine, and wherein the average angular offset is cross correlated with the second swirl.

\* \* \* \* \*